(12) United States Patent
Kim et al.

(10) Patent No.: US 12,437,784 B2
(45) Date of Patent: Oct. 7, 2025

(54) IMAGE PROCESSING METHOD AND ELECTRONIC DEVICE SUPPORTING SAME

(71) Applicant: Samsung Electronics Co., Ltd., Suwon-si (KR)

(72) Inventors: Kyuwon Kim, Suwon-si (KR); Jongkyu Kim, Suwon-si (KR); Sujung Bae, Suwon-si (KR); Tushar Balasaheb Sandhan, Suwon-si (KR); Heekuk Lee, Suwon-si (KR); Inho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/342,577

(22) Filed: Jun. 27, 2023

(65) Prior Publication Data

US 2023/0343367 A1    Oct. 26, 2023

Related U.S. Application Data

(63) Continuation of application No. PCT/KR2021/019983, filed on Dec. 28, 2021.

(30) Foreign Application Priority Data

Jan. 4, 2021 (KR) .................. 10-2021-0000527

(51) Int. Cl.
G11B 27/036 (2006.01)
G06V 10/74 (2022.01)
(Continued)

(52) U.S. Cl.
CPC .......... *G11B 27/036* (2013.01); *G06V 10/761* (2022.01); *G06V 20/46* (2022.01); *G06V 20/48* (2022.01); *H04N 5/265* (2013.01)

(58) Field of Classification Search
CPC .... G11B 27/036; G06V 20/46; G06V 10/761; G06V 20/48; H04N 5/265
See application file for complete search history.

(56) References Cited

U.S. PATENT DOCUMENTS 9,172,938 B2   10/2015   Yoneda et al.
9,294,706 B2    3/2016   Kim et al.
(Continued)

FOREIGN PATENT DOCUMENTS

CN    106657923 A    5/2017
CN    105282622 B    7/2018
(Continued)

OTHER PUBLICATIONS

Kanazawa A et al., End-to-end Recovery of Human Shape and Poseions, IEEE/CVF Conference on Computer Vision and Pattern Recognition, 2018, 10 pages.
Pose estimation, Online:https://www.tensorflow.org/lite/examples/pose_estimation/overview, Last Updated Mar. 31, 2022, 5 pages.
(Continued)

Primary Examiner — Thai Q Tran
Assistant Examiner — Jose M Mesa
(74) Attorney, Agent, or Firm — NIXON & VANDERHYE P.C.

(57) ABSTRACT

An image processing method and/or an electronic device supporting same. The electronic device may include a display and a processor, wherein the processor may be configured to: identify a first playback section in first media data including first video data and first audio data; identify a second playback section, on the basis of at least one of second audio data and a degree of similarity to a first object included in a first image corresponding to an end point of the first playback section, in second media data including second video data and the second audio data; and display, on the display, a screen according to layback of content including the first playback section and the second playback section.

12 Claims, 11 Drawing Sheets

(51) Int. Cl.
*G06V 20/40* (2022.01)
*H04N 5/265* (2006.01)

(56) References Cited

U.S. PATENT DOCUMENTS

| | | | |
|---|---|---|---|
| 9,886,650 | B2 | 2/2018 | Kwak et al. |
| 10,171,731 | B2 | 1/2019 | Jung et al. |
| 2002/0191113 | A1 | 12/2002 | Siefken |
| 2004/0100487 | A1* | 5/2004 | Mori .................. H04N 21/426 |
| 2014/0288686 | A1 | 9/2014 | Sant et al. |
| 2015/0189368 | A1* | 7/2015 | Lee .................. H04N 21/8456 |
| | | | 725/37 |
| 2018/0225261 | A1 | 8/2018 | Lee et al. |
| 2020/0152240 | A1 | 5/2020 | Xu et al. |
| 2021/0192194 | A1* | 6/2021 | Chi ........................ G06N 3/02 |
| 2022/0060672 | A1 | 2/2022 | Araki et al. |

FOREIGN PATENT DOCUMENTS

| | | |
|---|---|---|
| CN | 108629828 A | 10/2018 |
| JP | H11331829 A | 11/1999 |
| JP | 4956239 B2 | 3/2012 |
| JP | 2017228906 A | 12/2017 |
| KR | 100522171 B1 | 10/2005 |
| KR | 20160058519 A | 5/2016 |
| KR | 20170057901 A | 5/2017 |
| KR | 20190114548 A | 10/2019 |
| KR | 102045245 B1 | 12/2019 |
| KR | 102121534 B1 | 6/2020 |
| WO | 2020137584 A1 | 7/2020 |

OTHER PUBLICATIONS

Korean Office Action dated Aug. 22, 2025 issued in Korean Patent Application No. 10-2021-0000527 and English translation, 13 pp.

* cited by examiner

IMAGE PROCESSING METHOD AND ELECTRONIC DEVICE SUPPORTING SAME

CROSS-REFERENCE TO RELATED APPLICATIONS

This application is a continuation of International Application No. PCT/KR2021/019983 filed on Dec. 28, 2021, designating the United States, and claiming priority to Korean Patent Application No. 10-2021-0000527 filed on Jan. 4, 2021, in the Korean Intellectual Property Office, the disclosures of all of which are hereby incorporated by reference herein in their entireties.

BACKGROUND

Field

Various example embodiments relate to a method of processing an image and/or an electronic device supporting the same.

DESCRIPTION OF RELATED ART

An electronic device may display a screen according to execution of content on a display. For example, the electronic device may synthesize a plurality of pieces of data (for example, image data and/or video data) into one content and display a screen according to execution of the synthesized content on the display.

When synthesizing a plurality of pieces of data into one content, a conventional electronic device may dispose first data in a first section and second data in a second section among entire reproduction sections, so as to generate content obtained by synthesizing the first data and the second data. However, the conventional electronic device asks a user to input disposition sections of the first data and the second data among the entire reproduction sections, and thus could not help having high user-dependency. Further, when the first data is switched to the second data, the conventional electronic device causes sudden screen switching due to discontinuity of a first object included in the first data and a second object included in the second data even though a user input is not needed and the first data and the second data are disposed within the entire reproduction sections.

SUMMARY

Various example embodiments provide an image processing method of determining data to be disposed in a predetermined section among entire reproduction sections of content on the basis of a similarity between different pieces of data and an electronic device supporting the same.

An electronic device according to an example embodiment may include a display, and a processor electrically connected, directly or indirectly, to the display, wherein the processor may be configured to identify a first reproduction section corresponding to at least some of reproduction sections of first video data from first media data including the first video data and first audio data, identify a second reproduction section corresponding to at least some of reproduction sections of second video data from second media data including the second video data and second audio data corresponding to at least some of the first audio data, based on at least one of a similarity with a first object included in a first image corresponding to an end point of the first reproduction section or the second audio data, and display a screen according to reproduction of content including the first reproduction section and the second production section after the first reproduction section in a display area of the display.

An image processing method according to an example embodiment may include identifying a first reproduction section corresponding to at least some of reproduction sections of first video data from first media data including the first video data and first audio data, identifying a second reproduction section corresponding to at least some of reproduction sections of second video data from second media data including the second video data and second audio data corresponding to at least some of the first audio data, based on at least one of a similarity with a first object included in a first image corresponding to an end point of the first reproduction section or the second audio data, and displaying a screen according to reproduction of content including the first reproduction section and the second production section in a display area of the display.

An electronic device according to an example embodiment may include a display, and a processor electrically connected to the display, wherein the processor may be configured to identify a first image among a plurality of images, identify a second image among the plurality of images, based on a similarity with a first object included in the first image, and display a screen according to execution of content including the first image and the second image in a display area of the display.

Further, an image processing method according to an example embodiment may include identifying a first image among a plurality of images, identifying a second image among the plurality of images, based on a similarity with a first object included in the first image, and displaying a screen according to execution of content including the first image and the second image in a display area of the display.

According to various example embodiments, an image processing method and/or an electronic device supporting the same can determine pieces of data to be disposed in predetermined sections among entire reproduction sections of content, so as to smoothly switch the screen when the screen is switched according to execution of the content.

In addition, various effects directly or indirectly understood through the disclosure may be provided.

BRIEF DESCRIPTION OF DRAWINGS

The above and other aspects, features and advantages of certain embodiments will be more apparent from the following detailed description, taken in conjunction with the accompanying drawings, in which.

In connection with description of drawings, the same reference numeral is assigned to the same or corresponding elements.

DETAILED DESCRIPTION

Hereinafter, various example embodiments will be described with reference to the accompanying drawings. However, this does not limit the disclosure to specific embodiments, and it should be understood that various modifications, equivalent, and/or alternative of example embodiments are included.

Figure 1:
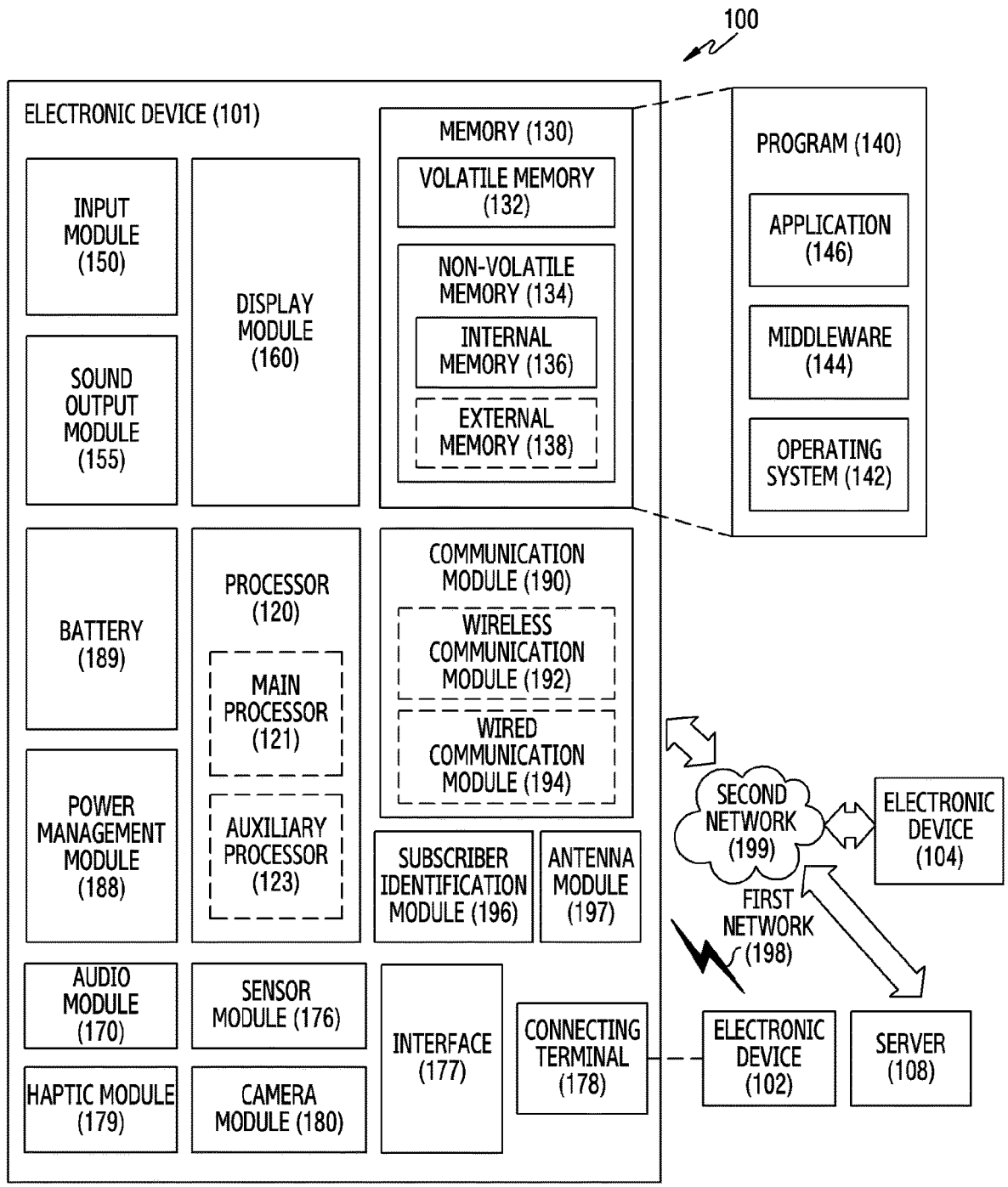
FIG. 1 illustrates an electronic device within a network environment according to an example embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190, comprising communication circuitry, may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192, comprising communication circuitry, may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
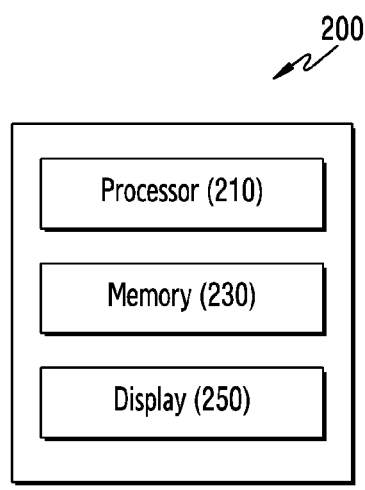
FIG. 2 is a block diagram illustrating an electronic device according to an example embodiment.

FIG. 2 is a block diagram of the electronic device according to an embodiment.

Referring to FIG. 2, an electronic device 200 (for example, the electronic device 101 of FIG. 1) may synthesize a plurality of pieces of data (for example, image data and/or video data) into one content and display the synthesized content in a display area of a display 250. For example, the electronic device 200 may synthesize a plurality of pieces of media data into one content (for example, video content). In another example, the electronic device 200 may synthesize different images among a plurality of images into one content (for example, photo slideshow).

The electronic device 200 may include a processor 210, a memory 230, and a display 250. However, elements of the electronic device 200 are not limited thereto. In various embodiments, the electronic device 200 may omit one of the elements and/or include at least one additional element. For example, the electronic device 200 may further include a camera module (for example, the camera module 180 of FIG. 1, comprising a camera).

According to an embodiment, the processor 210 (for example, the processor 120 of FIG. 1) may extract a plurality of reproduction sections, also known as playback sections, from a plurality of multimedia and synthesize the same into one content. For example, the processor 210 may extract a first reproduction section from first video data of first media data and extract a second reproduction section from second video data of second media data on the basis of a similarity with a first object included in a first image located within the first reproduction section. The first image may be an image located at an end point of the first reproduction section. A second object having a similarity with the first object that is larger than or equal to a predetermined similarity may be included in a second image located at a start point of the second reproduction section. As used herein, "playback" has the same meaning as "reproduction", e.g., a "reproduction section" is also referred to as a "playback section".

According to an embodiment, the processor 210 may determine at least one of the position, the shape, and/or the composition on the basis of key points of the first object included in the first image located at the end point of the first reproduction section. For example, on the basis of distribution of key points making appearance of various objects (for example, a person, a thing, and an animal), the processor 210 may determine at least one of the position, the shape, and/or the composition of the corresponding object. In an embodiment, when the first object is a person, the processor 210 may determine a position in which the right arm is raised while the left arm is lowered on the basis of distribution of the key points. In an embodiment, when the first object is a thing (for example, a vehicle), the processor 210 may determine a shape or composition according to a location of a first point (for example, the left headlight) and a location of a second point (for example, the right wheel) on the basis of distribution of the key points.

According to an embodiment, the processor 210 may determine a similarity between the first object included in the first image located at the end point of the first reproduction section and the second object included in the second image located at the start point of the second reproduction section on the basis of at least one of the position, the shape, and/or the composition. For example, when the first object is a person, the processor 210 may compare a similarity with the position of the first object among a plurality of images located within a reproduction section of second video data on the basis of a position corresponding to the position in which the right arm is raised while the left arm is lowered. In an embodiment, the processor 210 may extract a reproduction section (for example, the second reproduction section) including the second object having a similarity larger than or equal to a predetermined similarity (for example, 70%) with at least one of the position, the shape, and/or the composition of the first object among the plurality of images located within the reproduction section of the second video data.

According to an embodiment, when a similarity between the first object located at the end point of the first reproduction section and the second object located at the start point of the second reproduction section is smaller than a predetermined similarity, the processor 210 may generate an interpolation image on the basis of key points between key points of the first object and key points of the second object. For example, when the similarity between the first object and the second object is smaller than the predetermined similarity, the processor 210 may generate third key points located between first key point and second key points on the basis of the first key points of the first object and the second key points of the second object and may generate a third image including a third object obtained by calibrating the position, the shape, or the composition of the first object (or the second object) on the basis of the generated third key point. In various embodiments, the processor 210 may configure a skeleton by connecting the first key points and the second key points and configure a new skeleton connecting the third key points on the basis of a motion vector of the configured skeleton, so as to generate the third image including the third object. In various embodiments, the processor 210 may generate the third image including the third object similar to the first object and the second object by using a learning model (for example, a generative adversarial network (GAN)). In various embodiments, even though the similarity with the first object does not meet the predetermined similarity (for example, is not larger than or equal to the predetermined similarity), the processor 210 may extract the second reproduction section including the second object having the similarity close to the predetermined similarity from the second video data.

According to an embodiment, when the similarity between the first object located at the end point of the first reproduction section and the second object located at the start point of the second reproduction section is smaller than the predetermined similarity, the processor 210 may extract the second reproduction section from the second video data of second media data on the basis of a first part corresponding to the first reproduction section in first audio data included in first media data and a second part corresponding to the first part in second audio data included in the second media data. For example, when the similarity between the first object and the second object is smaller than the predetermined similarity, the processor 210 may extract the second reproduction section of the second video data corresponding to the second part that matches the first part of the first audio data corresponding to the first reproduction section in the second audio data.

According to an embodiment, the processor 210 may connect the first reproduction section and the second reproduction section on the basis of movement (for example, pan, tilt, zoom, and/or rotate) of the camera 180 capturing the object. For example, the processor 210 may configure a ratio of the first object included in the first image located at the end point of the first reproduction section to a background of the first image as a first ratio, configure a ratio of the second object included in the second image located at the start point of the second reproduction section to a background of the second image as a second ratio (for example, a ratio larger than the first ratio), and apply a zoom effect when the screen switches from the first reproduction section to the second reproduction section.

According to an embodiment, the processor 210 may extract at least two images from a plurality of images and synthesize the same into one content. For example, the processor 210 may extract the first image from the plurality of images, extract the second image from the plurality of images on the basis of the predetermined similarity with the first object included in the first image, and dispose the first image and the second image in the first reproduction section and the second reproduction section, respectively, so as to generate one content (for example, photo slideshow).

According to an embodiment, the processor 210 may determine at least one of the position, the shape, and/or the composition on the basis of key points of the first object included in the first image. For example, on the basis of distribution of key points making appearance of various objects (for example, a person, a thing, and an animal), the processor 210 may determine at least one of the position, the shape, and/or the composition of the corresponding object. In various embodiments, the processor 210 may additionally extract at least one image (for example, the third image) other than the first image and the second image on the basis of a predetermined similarity with the second image.

According to an embodiment, the processor 210 may apply an image effect to each of the first object included in the first image and the second object included in the second image. For example, the processor 210 may apply a fade-out effect to the first object in the first image disposed in the first reproduction section of the reproduction sections of content and apply a fade-in effect to the second object in the second image disposed in the second reproduction section after the first reproduction section. In order to apply the image effects, the first image may be an image captured in a first location of a first place at a first time point, and the second image may be an image captured in a second location (for example, a location adjacent to the first location) of a second place (for example, a place that is the same as the first place) at a second time point (for example, a time point after the first time). In various embodiments, the processor 210 may designate the first object and the second object as the foreground in the first image and the second image, respectively, designate areas except for the first object and the second object as the background, and apply the image effect (for example, fade-in or fade-out) to the objects designated as the foreground.

According to an embodiment, the processor 210 may cluster an object included in each of the plurality of images on the basis of at least one of the position, the shape, and/or the composition. For example, the processor 210 may classify an image including an object corresponding to a first position (for example, the position in which the right arm is raised while the left arm is lowered) among the plurality of images as a first group. Further, the processor 210 may classify an image including an object corresponding to a second position (for example, the position in which the right arm is lowered while the left arm is raised) among the plurality of images as a second group. Groups classified according to the example may be generated as designated information (for example, indexing information) to correspond to respective positions (or shapes or composition). In various embodiments, when disposition directions of the first object included in the first image and the second object included in the second image are different from each other, the processor 210 may normalize the position of each of the first object and the second object on the basis of a predetermined part of the key points of each of the first object and the second object (for example, in the case of a person, distribution of key points corresponding to the shoulder). In various embodiments, in order to determine the position of each of the first object and the second object, the processor 210 may normalize a distance (for example, Euclidean distance, 1) between key points of each of the first object and the second objects.

According to an embodiment, the processor 210 may extract images to be disposed in the reproduction sections of content from groups classified according to the clustering result on the basis of [Equation 1].

$$D(a, b) = \frac{1}{N} \sum_{n=1}^{N} (K_a^n - K_b^n)^2 \qquad \text{[Equation 1]}$$

Referring to [Equation 1], the processor 210 may extract a plurality of images (for example, the first image and the second image) on the basis of the number (N) of key points, coordinates ($K_a^n$) corresponding to key points of the first object (a), and coordinates $K_b^n$ corresponding to key points of the second object (b) in a first group $K_a$ and a second group $K_b$ including the first object (a) and the second (b), respectively.

According to an embodiment, the memory 230 (for example, the memory 130 of FIG. 1) may store a plurality of images for each group on the basis of at least one of the position, the shape, and/or the composition of the object included in each of the plurality of images. For example, the memory 230 may store an image (for example, a frame unit image) for each reproduction section of video data included in media data or an image including an object corresponding to the first position (for example, the position in which the right arm is raised while the left arm is lowered) in a single image as the first group. Further, the memory 230 may store an image for each reproduction section of video data included in media data or an image including an object corresponding to the second position (for example, the position in which the right arm is lowered while the left arm is raised) in a single image as the second group. The groups stored according to the example may be stored in the memory 230 as index information corresponding to the respective positions (or shapes or composition). For example, in the indexing information of the first group, a first identifier for identifying the object corresponding to the first position may be stored in a header or stored as a separate file and may be mapped to images included in the first group. In various embodiments, the memory 230 may further store audio data corresponding to the video data. For example, the audio data may be stored as one file with the video data or may be stored in the memory 230 separately from the video data.

According to an embodiment, a screen according to reproduction of content may be displayed on the display 250 (for example, the display module 160 of FIG. 1). For example, when the content is reproduced in a display area of the display 250 by the control of the processor 210, the second reproduction section (for example, a part of the second video data) may be displayed after the first reproduction section (for example, a part of the first video data) among the entire reproduction sections of the content is displayed. In this case, the first image located at the end point of the first reproduction section may be an image having a similarity larger than or equal to a predetermined similarity with the second image located at the start point of the second reproduction section for at least one of the position, the shape, and/or the composition. As another example, when the content is reproduced in the display area of the display 250 by the control of the processor 210, the second reproduction section (for example, the second image) may be displayed after the first reproduction section (for example, the first image) among the entire reproduction sections of the content is displayed. In this case, the first image may be an image having a similarity larger than or equal to a predetermined similarity with the second image for at least one of the position, the shape, and/or the composition.

Figure 3:
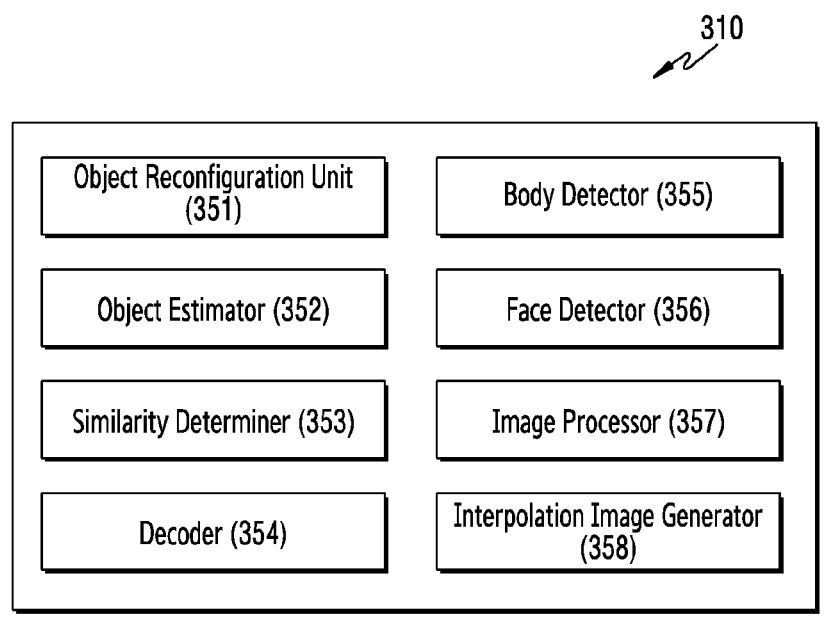
FIG. 3 illustrates a configuration of software related to image processing of the electronic device according to an example embodiment.

FIG. 3 illustrates a configuration of software related to image processing of the electronic device according to an embodiment.

Referring to FIG. 3, a processor 310 (for example, the processor 210 of FIG. 2) may determine at least one of the position, the shape, and/or the composition on the basis of key points of an object in an image corresponding to at least one frame among a plurality of frames of video data or a single image.

The processor 310 may include an object reconfiguration unit 351, an object estimator 352, a similarity determiner 353, a decoder 354, a body detector 355, a face detector 356, an image processor 357, and an interpolation image generator 358. However, the elements of the processor 310 are not limited thereto. In various embodiments, the processor 310 may omit one of the elements and/or include at least one additional element. According to various embodiments, at least one of the object reconfiguration unit 351, the object estimator 352, the similarity determiner 353, the decoder 354, the body detector 355, the face detector 356, the image processor 357, and the interpolation image generator 358 may be a software module which is stored in the memory (for example, the memory 230 of FIG. 2) and includes at least one instructions executed by the processor 310.

According to an embodiment, the object reconfiguration unit 351 may extract three-dimensional structure information related to the object included in the image from the image including color data (for example, RGB data). For example, when the object is identified in the image corresponding to at least one frame among the plurality of frames of the video data or the single image, the object reconfiguration unit 351 may reconfigure the identified object as a three-dimensional structure in the mesh form.

According to an embodiment, the object estimator 352 may extract two-dimensional structure information related to the object included in the image from the image including color data (for example, RGB data). For example, when the object is identified in the image corresponding to at least one frame among the plurality of images of the video data or the single image, the object estimator 352 may estimate the identified object as a two-dimensional structure in the form including a plurality of bones on the basis of the bones connecting key points of the identified object. In various embodiments, the object estimator 352 may reconfigure the object corresponding to the two-dimensional structure in the form including the plurality of bones to be the three-dimensional structure in the mesh form.

According to an embodiment, the similarity determiner 353 may determine a similarity between the plurality of images. For example, the similarity determiner 353 may determine whether the similarity between the first object and the second object is larger than or equal to a predetermined similarity by comparing at least one of the position, the shape, and/or the composition of the first object included in the first image with at least one of the position, the shape, and/or the composition of the second object included in the second image. In various embodiments, the similarity determiner 353 may extract images to be disposed in reproduction sections of content in groups classified according to the clustering result on the basis of [Equation 1] above.

According to an embodiment, the decoder 354 may decode at least one of the video data and the image. For example, the decoder 354 may decode content (for example, video content) including the first reproduction section extracted from the first video data and the second reproduction section extracted from the second video data. As another example, the decoder 354 may decode content (for example, photo slideshow) including the first image and the second image extracted from the plurality of images.

According to an embodiment, the body detector 355 may detect a body of the object included in the image. For example, when the object included in the image is a person, the body detector 355 may detect the body such as the upper body and the lower body of the person. In various embodiments, the body detector 355 may limit the object reconfiguration range of the body reconfiguration unit 351 and/or limit the object estimation range of the object estimator 352 on the basis of the body detected from the object included in the image.

According to an embodiment, the face detector 356 may detect the face of the object included in the image. For example, when the object included in the image is a person, the body detector 355 may detect the face of the person. In various embodiments, the body detector 355 may limit the object reconfiguration range of the object reconfiguration unit 351 and/or limit the object estimation range of the object estimator 352 on the basis of the face detected from the object included in the image.

According to an embodiment, the image processor 357 may perform image processing for an image acquired through the camera module (for example, the camera module 180 of FIG. 1) or an image stored in the memory 230. The image processing may include depth map generation, three-dimensional modeling, panorama generation, key point extraction, image synthesis, or image compensation (for example, noise reduction, resolution adjustment, brightness adjustment, blurring, sharpening, or softening). In various embodiments, the image processed by the image processor 357 may be stored again in the memory 230 for additional processing. At least some of the operations performed by the image processor 357 may be performed by at least one image signal processor included in the camera module (for example, the camera module 180).

According to an embodiment, when the similarity between the first image located within the first reproduction section and the second image located within the second reproduction section is smaller than the predetermined similarity, the interpolation image generator 358 may generate an interpolation image on the basis of key points of the first object included in the first image and key points of the second object included in the second image. For example, the interpolation image generator 358 may generate third key points located between the first key points and the second key points on the basis of the first key points and the second key points and generate a third image including a third object obtained by calibrating at least one of the position, the shape, and/or the composition of the first object (or the second object) on the basis of the generated third key points. As another embodiment, the interpolation image generator 358 may configure a skeleton by connecting the first key points and the second key points and configure a new skeleton connecting the third key points on the basis of a motion vector of the configured skeleton, so as to generate the third image including the third object. As another embodiment, the interpolation image generator 358 may generate the third image including the third object similar to the first object and the second object by using a learning model (for example, a generative adversarial network (GAN)).

Figure 4:
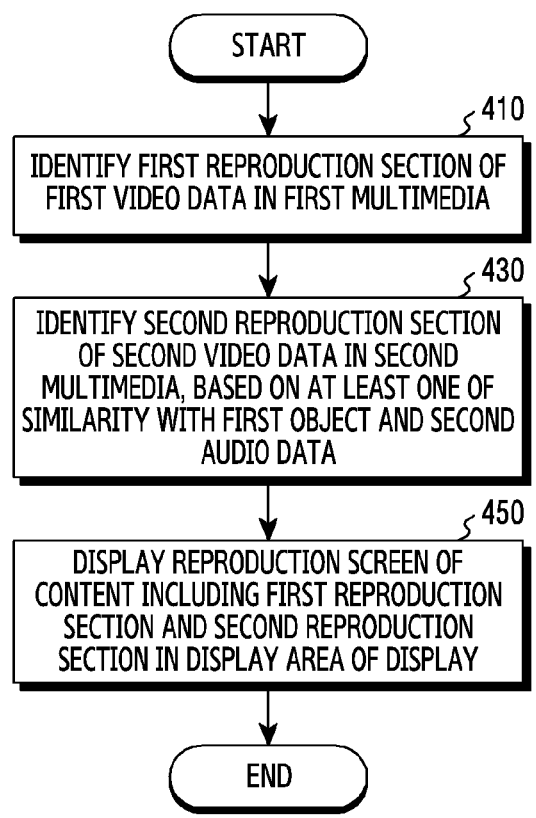
FIG. 4 is a flowchart illustrating an image processing method of the electronic device according to an example embodiment.

FIG. 4 is a flowchart illustrating an image processing method of the electronic device according to an embodiment.

Referring to FIG. 4, the electronic device (for example, the electronic device 200 of FIG. 2) may extract a plurality of reproduction sections from a plurality of pieces of media data and synthesize the same into one content.

In the following embodiments, respective operations may be sequentially performed but the sequential performance is not necessary. For example, orders of the operations may be changed, and at least two operations may be performed in parallel. Operations 410 to 450 may be performed by at least one element (for example, the processor 210 of FIG. 2) of the electronic device 200.

Referring to operation 410, the electronic device 200 may extract a first reproduction section from first video data of first media data. A first image including a first object may be disposed in a frame located at the end point of the first reproduction section. The first reproduction section may correspond to a first reproduction section among entire reproduction sections of content to be synthesized. In various embodiments, the first media data may include first audio data corresponding to the first video data.

Referring to operation 430, the electronic device 200 may extract a second reproduction section from second video data of second media data. For example, the electronic device 200 may extract the second reproduction section on the basis of a predetermined similarity between the first object included in the first image located at the end point of the first reproduction section and a second object included in a second image in a reproduction section of second video data. The second image may be an image located at the start point of the second reproduction section. As another example, when the media data includes audio data, the electronic device 200 may extract the second reproduction section from the second video data on the basis of a first part corresponding to the first reproduction section in the first audio data of first media data and a second part corresponding to the first part in the second audio data of second media data. In this case, when the similarity between the first object and the second object is smaller than a predetermined similarity, the electronic device 200 may extract the second reproduction section to correspond to the second part that matches the first part of the first audio data from the second audio data.

Referring to operation 450, the electronic device 200 may display a screen according to reproduction of content including the first reproduction section and the second reproduction section in a display area of the display (for example, the display 250 of FIG. 2). For example, in the display area of the display 250, the first reproduction section may be displayed from a first time point to a second time point and the second reproduction section may be displayed from a third time point to a fourth time point according to reproduction of the content. In this case, the second image of the second reproduction section displayed at the third time point may include the second object having a similarity larger than or equal to the predetermined similarity or more with the first object included in the first image of the first reproduction section displayed at the second time point.

Figure 5:
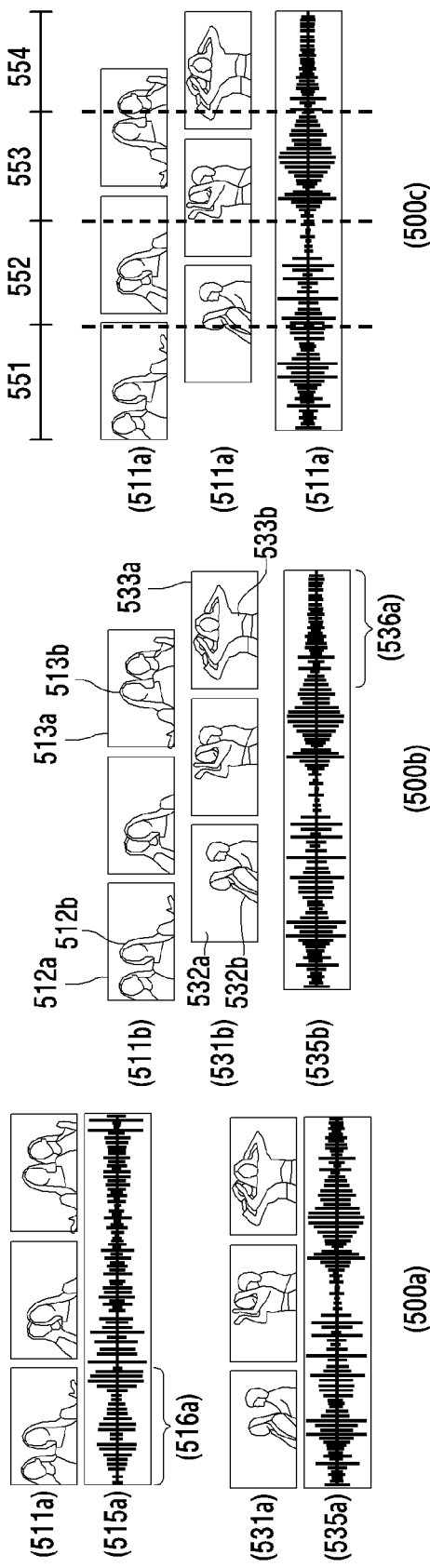
FIG. 5 illustrates a screen of the electronic device related to content generation according to an example embodiment.

FIG. 5 illustrates a screen of the electronic device related to content generation according to an embodiment.

Referring to FIG. 5, the electronic device (for example, the electronic device 200 of FIG. 2) may extract a first reproduction section to a fourth reproduction section in each of first media data and second media data on the basis of a first state 500a, a second state 500b, and a third state 500c.

Referring to the first state 500a, the electronic device 200 may store each of first media data including first video data 511a and first audio data 515a and second media data including second video data 531a and second audio data 515a in the memory (for example, the memory 230 of FIG. 2).

Referring to the second state 500b, the electronic device 200 may extract a plurality of reproduction sections 511b from the first video data 511a and extract a plurality of reproduction sections 531b from the second video data 531a on the basis of the plurality of extracted reproduction sections 511b. For example, the electronic device 200 may extract the second reproduction section in which a second image 532a including a second object 532b having a similarity larger than or equal to a predetermined similarity with a first object 512b included in a first image 512a located at the end point of the first reproduction section among the plurality of reproduction sections 531b is located at the start point. The extracted second reproduction section may be disposed in a reproduction section right after the first reproduction section in the entire reproduction sections of content. Meanwhile, when an object having the similarity larger than or equal to the predetermined similarity with a third object 513b included in a third image 513a located at the end point of a third reproduction section (for example, a reproduction section right after the second reproduction section in the entire reproduction sections of the content) among a plurality of reproduction sections 531b does not exist in the image of the second video data 531a, the electronic device 200 may extract the fourth reproduction section from the second video data 531a on the basis of a first part 516a corresponding to the second reproduction section from the first audio data 515a and a second part 536a corresponding to the first part 516a from the second audio data 535b. In the extracted fourth reproduction section, a fourth image 533a including a fourth object 533b relatively similar to the third object 513b among a plurality of images included in the second video data 531a may be disposed in accordance with the similarity between the first audio data 515a and the second audio data 535a. The extracted fourth reproduction section may be disposed in a reproduction section right after the third reproduction section in the entire reproduction sections of content.

Referring to the third state 500c, the electronic device 200 may dispose a plurality of different reproduction sections 511b and 531b in every predetermined reproduction section by the operation in the first state 500a and the second state 500b. For example, the electronic device 200 may alternately dispose some of the first video data 511a and the second video data 531a in each of the first reproduction section to the fourth reproduction section 551 to 554. For example, the electronic device may dispose the first image 512a including the first object 512b in the first reproduction section 551 in the entire reproduction sections of the content, dispose the second image 532a including the second object 532b in the second reproduction section 552, dispose the third image 513a including the third object 513b in the third reproduction section 553, and dispose the fourth image 533a including the fourth object 533b in the fourth reproduction section 554. In various embodiments, the electronic device 200 may overlap images of the start point and the end point in some of the reproduction sections for every reproduction section.

Figure 6:
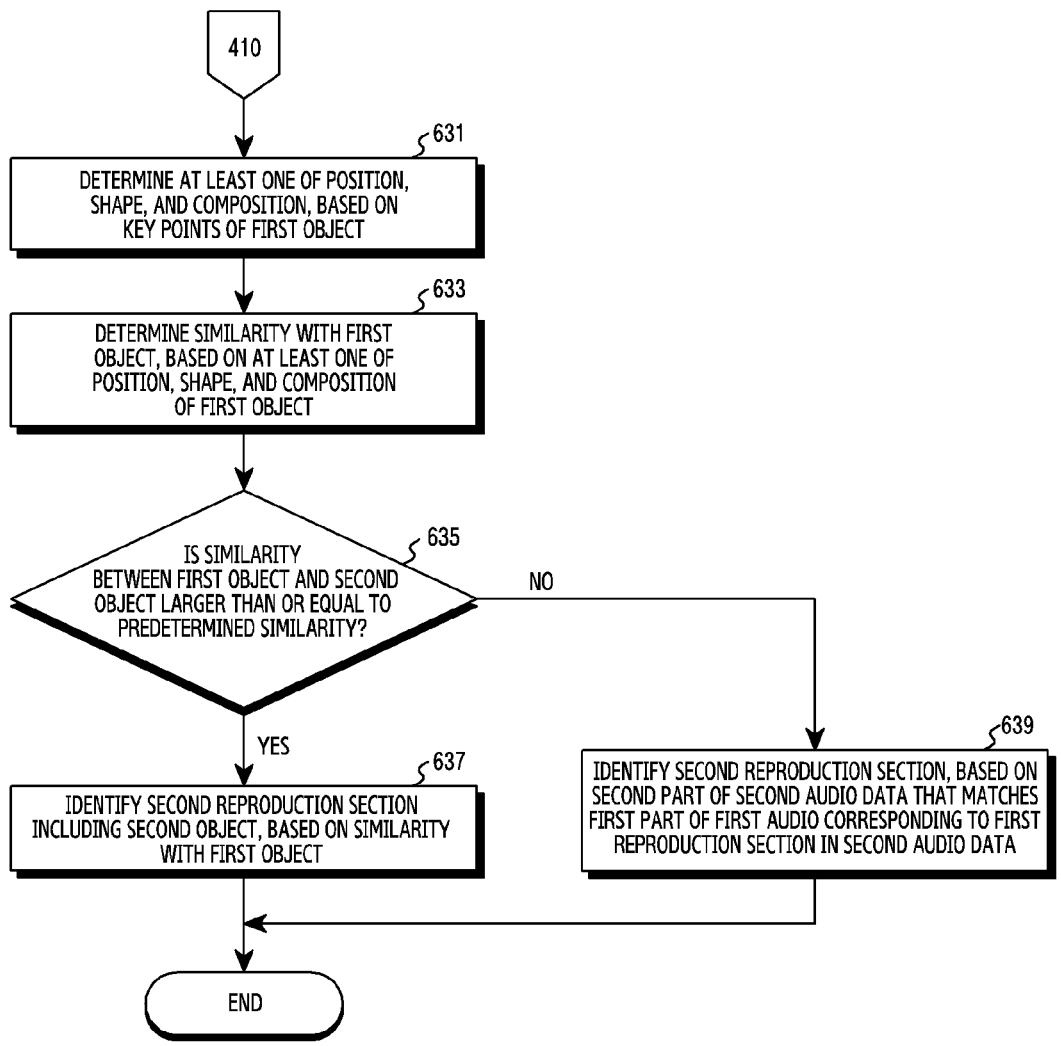
FIG. 6 is a flowchart illustrating an image processing method of the electronic device according to various example embodiments.

FIG. 6 is a flowchart illustrating an image processing method of the electronic device according to various embodiments.

Referring to FIG. 6, the electronic device (for example, the electronic device 200 of FIG. 2) may extract a first reproduction section of first video data from first media data and then extract a second reproduction section from second media data on the basis of a similarity between objects or whether audio data matches. In order to provide the above-described function, the electronic device 200 may perform operation 631, operation 633, operation 635, operation 637, and operation 639. In various embodiments, operation 631 to operation 639 may be performed after operation 410 of FIG. 4.

In the following embodiments, respective operations may be sequentially performed but the sequential performance is not necessary. For example, orders of the operations may be changed, and at least two operations may be performed in parallel. Operations 631 to 639 may be performed by at least one element (for example, the processor 210 of FIG. 2) of the electronic device 200.

Referring to operation 631, the electronic device 200 may determine at least one of the position, the shape, and/or the composition on the basis of key points of a first object included in a first image located at the end point of the first reproduction section. For example, on the basis of distribution of key points making appearance of various objects (for example, a person, a thing, and an animal), the processor 210 may determine the position, the shape, and/or the composition of the corresponding object.

Referring to operation 633, the electronic device 200 may determine a similarity between the first object included in the first image located at the end point of the first reproduction section and a second object included in a second image located at the start point of the second reproduction section on the basis of at least one of the position, the shape, and/or the composition.

Referring to operation 635, the electronic device 200 may determine whether the similarity between the first object included in the first image located at the end point of the first reproduction section and the second object included in the second image located at the start point of the second reproduction section is larger than or equal to a predetermined similarity. In an embodiment, when the similarity between the first object and the second object is larger than or equal to the predetermined similarity, the electronic device 200 may perform operation 637. In an embodiment, when the similarity between the first object and the second object is smaller than the predetermined similarity, the electronic device 200 may perform operation 639.

Referring to operation 637, the electronic device 200 may extract the second reproduction section including the second object having the predetermined similarity or more with at least one of the position, the shape, and/or the composition of the first object among a plurality of images located within reproduction sections of second video data. In various embodiments, the electronic device 200 may dispose the second reproduction section after the first reproduction section among the entire reproduction sections of content.

Referring to operation 639, the electronic device 200 may extract the second reproduction section from second video data on the basis of a first part corresponding to the first reproduction section in first audio data and a second part corresponding to the first part in second audio data. For example, when the similarity between the first object and the second object is smaller than the predetermined similarity, the electronic device 200 may extract the second reproduction section of the second video data corresponding to the second part that matches the first part of the first audio data from the second audio data.

Figure 7:
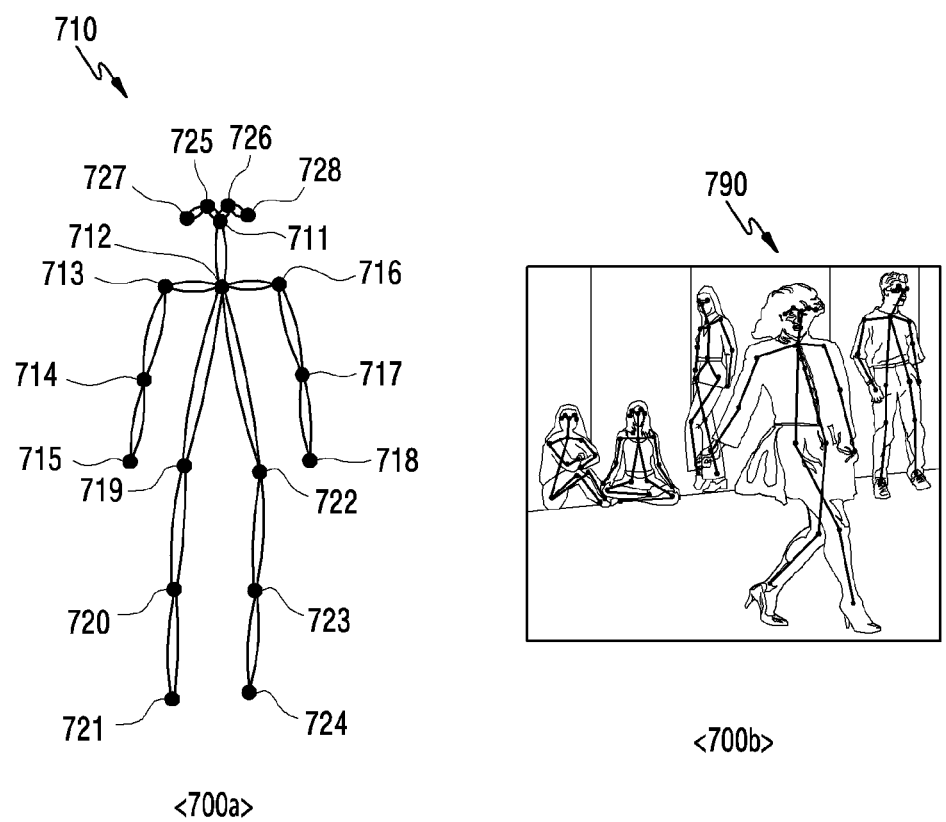
FIG. 7 illustrates a screen of the electronic device related to key point extraction according to various example embodiments.

FIG. 7 illustrates a screen of the electronic device related to key point extraction according to various embodiments.

Referring to FIG. 7, the electronic device (for example, the electronic device 200 of FIG. 2) may determine at least one of the position, the shape, and/or the composition on the basis of key points of objects 710 and 790 included in images.

Referring to a first state 700a, when the object 710 included in the image is a person, the electronic device 200 may identify a first key point 711, a second key point 712, a third key point 713, a fourth key point 714, a fifth key point 715, a sixth key point 716, a seventh key point 717, an eighth key point 718, a ninth key point 719, a tenth key point 720, an eleventh key point 721, a twelfth key point 722, a thirteenth key point 723, a fourteenth key point 724, a fifteenth key point 725, a sixteenth key point 726, a seventeenth key point 727, and a eighteenth key point 728. In an embodiment, the electronic device 200 may identify a skeleton by connecting a plurality of key points. For example, the electronic device 200 may designate bones 713, 714, and 715 corresponding to the right arm of the person's body by connecting the third key point 713, the fourth key point 714, the fifth key point 715 and designate bones 716, 717, and 718 corresponding to the left arm of the person's body by connecting the sixth key point 716, the seventh key point 717, the eighth key point 718. Further, the electronic device 200 may designate bones 719, 720, and 721 corresponding to the right leg of the person's body by connecting the ninth key point 719, the tenth key point 720, the eleventh key point 721 and designate bones 722, 723, and 724 corresponding to the left leg of the person's body by connecting the twelfth key point 722, the thirteenth key point 723, the fourteenth key point 724.

Referring to the second state 700b, the electronic device 200 may determine at least one of the position, the shape, and/or the composition of the object 790 on the basis of the designated skeleton in the first state 700a. For example, the electronic device 200 may determine the position (or the shape or the composition) of the object 790 on the basis of the bones 713, 714, and 715 corresponding to the right arm 713, 714, and 715, the bones 716, 717, and 718 corresponding to the left arm, the bones 719, 720, and 721 corresponding to the right leg, and the bones 722, 723, and 724 corresponding to the left leg. In various embodiments, when disposition directions of the object 790 disposed in a plurality of respective images are different, the electronic device 200 may normalize the position of the object 790 disposed in the plurality of respective images on the basis of the key points 712, 713, and 716 corresponding to the shoulder of the object 790.

Figure 8:
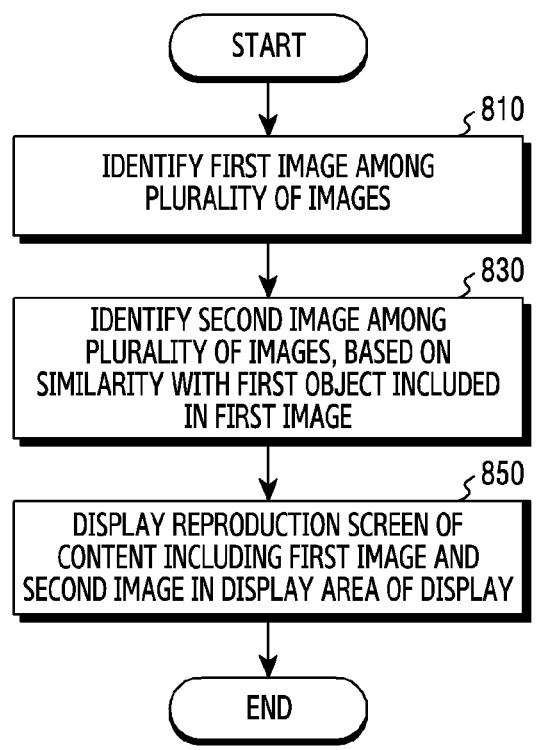
FIG. 8 is a flowchart illustrating an image processing method of the electronic device according to an example embodiment.

FIG. 8 is a flowchart illustrating an image processing method of the electronic device according to an embodiment.

Referring to FIG. 8, the electronic device (for example, the electronic device 200 of FIG. 2) may extract at least two images from a plurality of images and synthesize the same into one content. In order to provide the function, the electronic device 200 may perform operation 810, operation 830, and operation 850.

Referring to operation 810, the electronic device 200 may extract a first image from a plurality of images. The first image may include a first object for identifying at least one of the position, the shape, and/or the composition.

Referring to operation 830, the electronic device 200 may extract a second image from the plurality of images on the basis of a similarity with the first object included in the first image extracted in operation 810. The second image may include a second object having a similarity larger than or equal to a predetermined similarity with at least one of the position, the shape, and/or the composition of the first object.

Referring to operation 850, the electronic device 200 may display a screen according to reproduction of content including the first image and the second image extracted in operation 810 and operation 830 in a display area of the display (for example, the display 250 of FIG. 2). For example, the electronic device 200 may dispose the first image in a first reproduction section among reproduction sections according to reproduction of the content, dispose the second image in a second reproduction section after the first reproduction section, and display consecutive images between objects (the first object and the second object) in the display area when the switching from the first reproduction section to the second reproduction section is performed.

Figure 9:
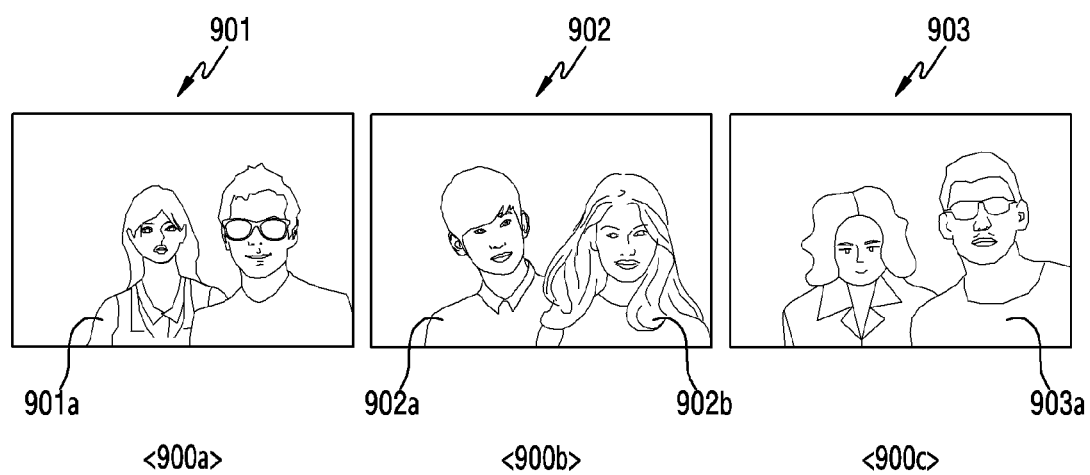
FIG. 9 illustrates a screen of the electronic device related to content generation according to an example embodiment.

FIG. 9 illustrates a screen of the electronic device related to content generation according to an embodiment.

Referring to FIG. 9, the electronic device (for example, the electronic device 200 of FIG. 2) may extract an image including objects having a similarity larger than or equal to a predetermined similarity from a plurality of images on the basis of a first state 900a, a second state 900b, and a third state 900c.

Referring to the first state 900a, the electronic device 200 may determine a first image 901 to be disposed in a first reproduction section of content among a plurality of images. In an embodiment, the electronic device 200 may determine a first object 901a for identifying at least one of the position, the shape, and/or the composition among objects included in the first image 901.

Referring to the second state 900b, the electronic device 200 may determine a second image 902 including an object having a similarity larger than or equal to a predetermine similarity with the first object 901a determined in the first state 900a. The second image 902 may include a second object 902a having a similarity larger than or equal to a predetermined similarity with at least one of the composition, the shape, and/or the composition of the first object 901a. In an embodiment, the electronic device 200 may dispose the second image 902 in a second reproduction section after the first reproduction section. In an embodiment, when there is a third reproduction section after the second reproduction section, the electronic device 200 may determine a third object 902b of which a similarity with an object included in an image to be disposed in the third reproduction section is to be compared may be determined among the objects included in the second image 902.

Referring to the third state 900c, the electronic device 200 may determine a third image 903 including an object having a similarity larger than or equal to a predetermined similarity with the third object 902b determined in the second state 900b. The third image 903 may include a fourth object 903a having a similarity larger than or equal to a predetermined similarity with at least one of the position, the shape, and/or the composition of the third object 902b. In an embodiment, the electronic device 200 may dispose the third image 903 in a third reproduction section after the second reproduction section.

Figure 10:
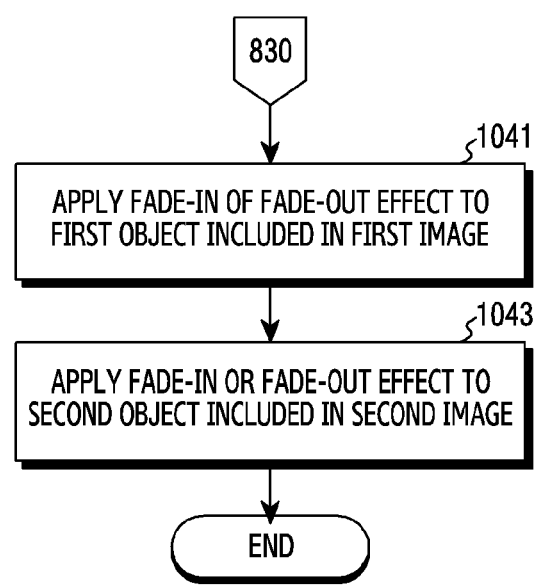
FIG. 10 is a flowchart illustrating an image processing method of the electronic device according to various example embodiments.

FIG. 10 is a flowchart illustrating an image processing method of the electronic device according to various embodiments.

Referring to FIG. 10, after extracting a first image and a second image from a plurality of images, the electronic device (for example, the electronic device 200 of FIG. 2) may apply an image effect to each of the extracted first image and second image. In order to provide the function, the electronic device 200 may perform operation 1041 and operation 1043. In various embodiments, operation 1041 and operation 1043 may be performed after operation 830 of FIG. 8.

In the following embodiments, respective operations may be sequentially performed but the sequential performance is not necessary. For example, orders of the operations may be changed, and at least two operations may be performed in parallel. Operations 1041 to 1043 may be performed by at least one element (for example, the processor 210 of FIG. 2) of the electronic device 200.

Referring to operation 1041, in the first image disposed in a first reproduction section among reproduction sections of content, the electronic device 200 may apply a fade-out (or fade-in) effect to a first object included in the first image. For example, when the fade-out effect is applied to the first object, the electronic device 200 may clearly display the first object in the start point of the first reproduction section on the basis of a predetermined first clarity and then gradually blurredly (or vanishingly) display the first object in the end point of the first reproduction section on the basis of a predetermined second clarity. According to various embodiments, the clarity may be determined on the basis of at least one of transparency, contrast, saturation, and/or brightness.

Referring to operation 1043, in a second image disposed in a second reproduction section after the first reproduction section among reproduction sections of content, the electronic device 200 may apply a fade-in (or fade-out) effect to a second object included in the second image. For example, when the fade-in effect is applied to the second object, the electronic device 200 may blurredly (or vanishingly) display the second object in the start point of the second reproduction section on the basis of the predetermined second clarity and then clearly display the second object in the end point of the second reproduction section on the basis of the predetermined first clarity. The second object may be disposed in located adjacent to the first object of operation 1041 in the same or similar background.

Figure 11:
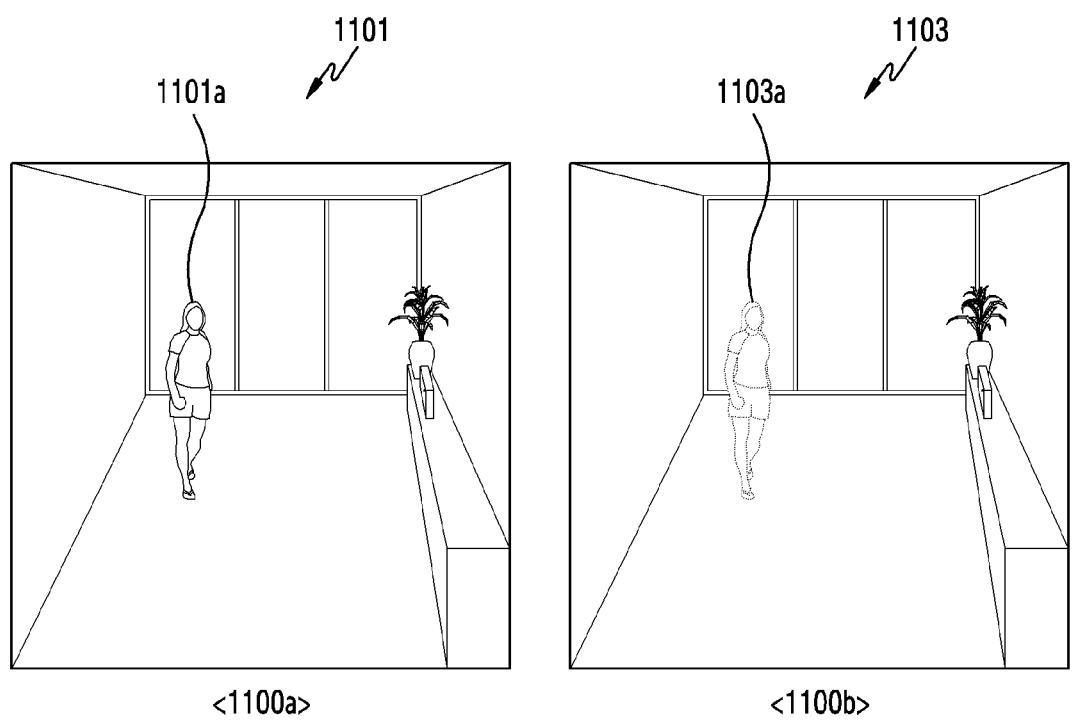
FIG. 11 illustrates a screen related to an image effect of the electronic device according to various example embodiments.

FIG. 11 illustrates a screen related to an image effect of the electronic device according to various embodiments.

Referring to FIG. 11, the electronic device (for example, the electronic device 200 of FIG. 2) may apply different image effects to images disposed in a first reproduction section 1100a and a second reproduction section 1100b among reproduction sections of content. Images disposed in the first reproduction section 1100a and the second reproduction section 1100b may be video data including a plurality of images or moving images (for example, a gif file).

Referring to the first reproduction section 1100a, the electronic device 200 may apply a fade-out effect to a first object 1101a in a first image 1101. For example, when the fade-out effect is applied to the first object 1101a, the electronic device 200 may clearly display the first object 1101a in the start point of the first reproduction section 1100a on the basis of a predetermined first clarity and then gradually blurredly display the first object 1101a in the end point of the first reproduction section 1100a on the basis of a second predetermined clarity (for example, a clarity lower than the first clarity).

Referring to the second reproduction section 1100b, the electronic device 200 may apply the fade-out effect to a second object 1103a in a second image 1103. For example, when the fade-out effect is applied to the second object 1103a, the electronic device 200 may display the second object 1103a in the start point of the second reproduction section 1100b on the basis of a predetermined third clarity (for example, a clarity lower than the second clarity) more blurredly than the first object 1101a and then gradually blurredly (or vanishingly) display the second object in the end point of the second reproduction section 1100b on the basis of a predetermined fourth clarity (for example, a clarity lower than the third clarity). The second object 1103a may be disposed adjacent to the first object 1101a in the same or similar background.

According to various embodiments, an electronic device (for example, the electronic device 200 of FIG. 2) may include a display (for example, the display 250 of FIG. 2) and a processor (for example, the processor 210 of FIG. 2) electrically connected to the display 250, and the processor 210 may be configured to identify a first reproduction section (for example, the first reproduction section 551 of FIG. 5) corresponding to at least some of reproduction sections of first video data (for example, the first video data 511a) from first media data including the first video data 511a and first audio data (for example, the first audio data 515a of FIG. 5), identify a second reproduction section (for example, the second reproduction section 552 of FIG. 5) corresponding to at least some of reproduction sections of second video data (for example, the second video data 531a of FIG. 5) from second media data including the second video data 531a and second audio data (for example, the second audio data 535a of FIG. 5) corresponding to at least some of the first audio data 515a, based on at least one of a similarity with a first object (for example, the first object 512b of FIG. 5) included in a first image (for example, the first image 512a of FIG. 5) corresponding to an end point of the first reproduction section 551 or the second audio data 535a, and display a screen according to reproduction of content including the first reproduction section 551 and the second production section 552 after the first reproduction section 551 on the display 250.

According to various embodiments, the processor 210 may be configured to determine the similarity with the first object 512b, based on at least one of a position, a shape, or composition of the first object 512b.

According to various embodiments, the processor 210 may be configured to determine at least one of the position, the shape, or the composition, based on key points (for example, the first to fourteenth key points 711 to 724 of FIG. 7) of the first object 512b.

According to various embodiments, the processor 210 may be configured to identify the second reproduction section 552, based on a similarity between a second object (for example, the second object 532b of FIG. 5) included in a second image (for example, the second image 532a of FIG. 5) corresponding to a start point of the second reproduction section 552 and the first object 512b.

According to various embodiments, in case that the similarity between the first object 512b and the second object 532b is smaller than a predetermined similarity, the processor 210 may be configured to generate an interpolation image, based on key points between key points 711 to 724 of the first object 512*b* and key points 711 to 724 of the second object 532*b*.

According to various embodiments, the processor 210 may be configured to identify the second reproduction section 552, based on whether a first part (for example, the first part 516*a* of FIG. 5) corresponding to the first reproduction section 551 among the first audio data 515*a* matches a second part 536 corresponding to the first part 516*a* among the second audio data 535*a*.

According to various embodiments, an image processing method may include an operation (for example, operation 410 of FIG. 4) of identifying a first reproduction section 551 corresponding to at least some of reproduction sections of first video data 511*a* from first media data including the first video data 511*a* and first audio data 515*a*, an operation (operation 430 of FIG. 4) of identifying a second reproduction section 552 corresponding to at least some of reproduction sections of second video data 531*a* from second media data including the second video data 531*a* and second audio data 535*a* corresponding to at least some of the first audio data 515*a*, based on at least one of a similarity with a first object 512*b* included in a first image 512*a* corresponding to an end point of the first reproduction section 551 or the second audio data 535*a*, and an operation (for example, operation 450 of FIG. 4) of displaying a screen according to reproduction of content including the first reproduction section 551 and the second production section 552 after the first reproduction section 551 on the display 250 of the electronic device 200.

According to various embodiments, the operation (operation 430) of identifying the second reproduction section 552 may include determining the similarity with the first object 512*b*, based on at least one of a position, a shape, or composition of the first object 512*b*.

According to various embodiments, the operation (operation 430) of identifying the second reproduction section 552 may include determining at least one of the position, the shape, or the composition, based on key points 711 to 724 of the first object 512*b*.

According to various embodiments, the operation (operation 430) of identifying the second reproduction section 552 may include identifying the second reproduction section 552, based on a similarity between a second object 532*b* included in a second image 532*a* corresponding to a start point of the second reproduction section 552 and the first object 512*b*.

According to various embodiments, in case that the similarity between the first object 512*b* and the second object 532*b* is smaller than a predetermined similarity, the method may further include an operation of generating an interpolation image, based on key points between key points 711 to 724 of the first object 512*b* and key points 711 to 724 of the second object 532*b*.

According to various embodiments, the operation (operation 430) of identifying the second reproduction section 552 may include identifying the second reproduction section 552, based on whether a first part 516*a* corresponding to the first reproduction section 551 among the first audio data 515*a* matches a second part 536*a* corresponding to the first part 516*a* among the second audio data 535*a*.

According to various embodiments, the electronic device 200 may include the display 250 and the processor 210 electrically connected, directly or indirectly, to the display 250, and the processor 210 may be configured to identify a first image (for example, the first image 901 of FIG. 9) among a plurality of images, identify a second image (for example, the second image 902 of FIG. 9) among the plurality of images, based on a similarity with a first object 901*a* included in the first image 901, and display a screen according to execution of content including the first image 901 and the second image 902 in a display area of the display 250.

According to various embodiments, the processor 210 may be configured to determine a similarity between a second object 902*a* included in the second image 902 and the first object 901*a*, based on at least one of a position, a shape, or composition of the first object 901*a*.

According to various embodiments, the processor 210 may be configured to determine at least one of the position, the shape, or the composition, based on key points 711 to 724 of the first object 901*a*.

According to various embodiments, the processor 210 may be configured to apply a fade-in or fade-out effect to the first object 901*a* in the first image 901 and apply a fade-in or fade-out effect to the second object 902*a* included in the second image 902 in the second image 902.

According to various embodiments, the image processing method may include an operation (for example, operation 810 of FIG. 8) of identifying the first image 901 among a plurality of images, an operation (for example, operation 830 of FIG. 8) of identifying the second image 902 among the plurality of images, based on a similarity with the first object 901*a* included in the first image 901, and an operation (for example, operation 850 of FIG. 8) of displaying a screen according to execution of content including the first image 901 and the second image 902 in a display area of the display 250.

According to various embodiments, an operation (operation 830) of identifying the second image 902 may determine a similarity with the first object 901*a*, based on at least one of a position, a shape, or composition of the first object 901*a*. "Based on" as used herein covers based at least on.

According to various embodiments, an operation (operation 830) of identifying the second image 902 may include an operation of determining at least one of the position, the shape, or the composition, based on key points 711 to 724 of the first object 901*a*.

According to various embodiments, the method may further include operations (for example, operation 1041 and operation 1043 of FIG. 10) of applying a fade-in or fade-out effect to the first object 901*a* in the first image 901 and applying a fade-in or fade-out effect to the second object 902*a* included in the second image 902 in the second image 902.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an example embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B,"

"at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various example embodiments, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
a display; and
memory storing instructions, and
at least one processor, comprising processor circuitry, electrically connected to the display;
wherein the instructions when executed by the at least one processor, individually and/or collectively, cause the electronic device to:
identify a first reproduction section corresponding to at least some reproduction sections of first video data from first media data including the first video data and first audio data;
identify a second reproduction section corresponding to at least some reproduction sections of second video data from second media data including the second video data and second audio data corresponding to at least some of the first audio data, based on at least one of a similarity with a first object included in a first image corresponding to an end point of the first reproduction section or the second audio data;
synthesize a first content corresponding to the first reproduction section and a second content corresponding to the second reproduction section into one synthesized content; and
display a screen based on reproduction of the one synthesized content including the first reproduction section and the second production section after the first reproduction section on the display, and
identify the second reproduction section, based on a similarity between a second object included in a second image corresponding to a start point of the second reproduction section and the first object, and
based on the similarity between the first object and the second object being smaller than a predetermined similarity, generate an interpolation image, based on key points between key points of the first object and key points of the second object.

2. The electronic device of claim 1, wherein the at least one processor is configured to determine the similarity with the first object, based on at least one of a position, a shape, or composition of the first object.

3. The electronic device of claim 2, wherein the at least one processor is configured to determine at least one of the position, the shape, or the composition, based on key points of the first object.

4. The electronic device of claim 1, wherein the at least one processor is configured to identify the second reproduction section, based on whether a first part corresponding to the first reproduction section among the first audio data matches a second part corresponding to the first part among the second audio data.

5. A method of processing an image by an electronic device, the method comprising:
   identifying a first reproduction section corresponding to at least some reproduction sections of first video data from first media data including the first video data and first audio data;
   identifying a second reproduction section corresponding to at least some reproduction sections of second video data from second media data including the second video data and second audio data corresponding to at least some of the first audio data, based on at least one of a similarity with a first object included in a first image corresponding to an end point of the first reproduction section or the second audio data;
   synthesizing the first reproduction section and the second reproduction section into a single synthesized content;
   displaying the one synthesized content on a screen,
   identifying of the second reproduction section comprises identifying the second reproduction section, based on a similarity between a second object included in a second image corresponding to a start point of the second reproduction section and the first object; and
   based on the similarity between the first object and the second object being smaller than a predetermined similarity, generating an interpolation image, based on key points between key points of the first object and key points of the second object.

6. The method of claim 5, wherein the identifying of the second reproduction section comprises determining the similarity with the first object, based on at least one of a position, a shape, or composition of the first object.

7. The method of claim 6, wherein the identifying of the second reproduction section comprises determining at least one of the position, the shape, or the composition, based on key points of the first object.

8. The method of claim 5, wherein the identifying of the second reproduction section comprises identifying the second reproduction section, based on whether a first part corresponding to the first reproduction section among the first audio data matches a second part corresponding to the first part among the second audio data.

9. An electronic device comprising:
   a display; and
   memory storing instructions, and
   at least one processor, comprising processor circuitry, electrically connected to the display;
   wherein the instructions when executed by the at least one processor, individually and/or collectively, cause the electronic device to:
   identify a first image among a plurality of images;
   identify a second image among the plurality of images, based on a similarity with a first object included in the first image;
   synthesize the first image and the second image into one synthesized content;
   based on the similarity between the first object and the second object being smaller than a predetermined similarity, generate an interpolation image, based on key points between key points of the first object and key points of the second object; and
   display a screen based on execution of the one synthesized content including the first image and the second image on the display.

10. The electronic device of claim 9, wherein the at least one processor is configured to determine the similarity between a second object included in the second image and the first object, based on at least one of a position, a shape or composition of the first object.

11. The electronic device of claim 10, wherein the at least one processor is configured to determine at least one of the position, the shape or the composition, based on key points of the first object.

12. The electronic device of claim 9, wherein the at least one processor is configured to:
   apply a fade-in or fade-out effect to the first object in the first image; and
   apply a fade-in or fade-out effect to a second object included in the second image.

* * * * *